(12) United States Patent
Lyons et al.

(10) Patent No.: US 7,897,293 B2
(45) Date of Patent: Mar. 1, 2011

(54) PLATINUM-IMPREGNATED HYDROUS TIN OXIDE CATALYSTS

(75) Inventors: Karen S. Lyons, Alexandria, VA (US); Norma P. Ugarte, El Paso, TX (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 2125 days.

(21) Appl. No.: 10/693,845

(22) Filed: Oct. 20, 2003

(65) Prior Publication Data

US 2005/0084740 A1    Apr. 21, 2005

(51) Int. Cl.
*H01M 4/92* (2006.01)
(52) U.S. Cl. ................. 429/524; 429/525; 429/527; 429/528; 429/530
(58) Field of Classification Search ............. 429/40–44, 429/523–525, 527, 528, 532, 530
See application file for complete search history.

(56) References Cited

U.S. PATENT DOCUMENTS 5,922,487 A * 7/1999 Watanabe et al. ............. 429/44

OTHER PUBLICATIONS

Hawley's Condensed Chemical Dictionary, 11th edition, pp. 611 and 349-350, 1987.*

Gardner et al, "Characterization Study of Silica-Supported Platinized Tin Oxide Catalysts Used for Low-Temperature CO Oxidation: Effect of Pretreatment Temperature", The Journal of Physical Chemistry, 1991, pp. 835-838, vol. 95, No. 2. American Chemical Society.

Katayama et al, "Electrooxidation of Methanol on a Platinum-Tin Oxide Catalyst", The Journal of Physical Chemistry, 1980, pp. 376-381, vol. 84, No. 4, American Chemical Society.

Ugarte et al, "Low-Platinum Tin-Oxide Electrocatalyst for Pem Fuel Cell Cathodes", 202nd Electrochemical Society Meeting, Oct. 20-25, 2002, Salt Lake City.

Ugarte et al, "Low-Platinum Tin-Oxide Electrocatalyst for Pem Fuel Cell Cathodes", 202nd Electrochemical Society Meeting, Oct. 20-25, 2002, Salt Lake City, UT.

Swider-Lyons et al, "Low-Platinum Hydrous Metal Oxides for PEMFC Cathodes", NRL DOE review, May 19, 2003, pp. 1-5.

Watanabe et al., "Preparation of Dispersed Platinum on Conductive Tin Oxide and Its Catalytic Activity for Oxygen Reduction," J. Electrochem. Soc., 130(1). (Jan. 1983).

* cited by examiner

*Primary Examiner*—Tracy Dove
(74) *Attorney, Agent, or Firm*—Amy L. Ressing; Joseph T. Grunkemeyer

(57) ABSTRACT

A chemical composition is provided having the formula:

$$M\text{—}SnO_x \cdot yH_2O$$

M is a platinum group metal and x and y are positive numbers. The hydrous platinum tin oxide may be used in the cathode of a fuel cell as a catalyst for oxygen reduction.

18 Claims, 1 Drawing Sheet

PLATINUM-IMPREGNATED HYDROUS TIN OXIDE CATALYSTS

BACKGROUND OF THE INVENTION

1. Field of the Invention

The invention relates generally to compositions that may be useful as fuel cell catalysts.

2. Description of the Prior Art

Proton exchange membrane fuel cells (PEMFCs) are currently under intense development as high-efficiency energy conversion devices. Before they become commercially viable, though, the cost of PEMFCs must be significantly reduced. A major contributor to the high cost of the fuel cells is their platinum catalysts, which are used to oxidize hydrogen and reduce oxygen at the anode and cathode respectively. The oxygen reduction reaction (ORR) and hydrogen oxidation reaction (HOR) are given in Eqs. 1 and 2. The platinum catalysts lower the activation energy of the reactions and make the PEMFCs efficient.

$$O_2 + 4H^+ + 4e^- \rightarrow 2H_2O \qquad (1)$$

$$H_2 \rightarrow 2H^+ + 2e^- \qquad (2)$$

Because the ORR is a 4-electron reaction, it is kinetically limited. To overcome this limitation, high platinum loadings at the cathode (e.g., 0.2 mg Pt/cm$^2$) have been used. Reducing platinum loading by at least a factor of 10 would help to make PEMFCs cost effective.

Researchers recognized years ago that the Pt content of PEMFC electrodes could be reduced by dispersing nanoscale Pt particles on a porous, electronically conductive media (Vulcan carbon) and adding a proton conducting media (a perfluorosulfonic ionomer, Nafion®) (Raistrick, U.S. Pat. No. 4,876,115. All referenced patents and publications are incorporated by reference). When surrounded by Vulcan carbon and Nafion, the Pt serves more effectively as an electrocatalyst for hydrogen oxidation and oxygen reduction because there are ample transport paths for protons and electrons. Whereas the catalytic activity of the Pt is limiting, the electrode reactions are mediated by the rate of the transport of the gases, protons, electrons, and water to and from the Pt surfaces.

A few other reports have tried to improve the activity of Pt by dispersing it on oxide supports. Tseung and Dhara disclosed a dispersion of metallic Pt on a semiconducting oxide support (Tseung et al., "The reduction of oxygen on platinised Sb doped SnO$_2$ in 85% phosphoric acid," *Electrochim. Acta*, 1974, 19, 845-848.). Antimony-doped tin hydroxides were prepared in solution and then sintered at 500° C. to ensure good electronic conductivity, and then the oxides were impregnated with Pt and reduced in hydrogen. The Sn-based catalysts performed well vs. Pt blacks during pulsed measurements, but the steady-state performance of the Sn catalyst was poor.

Watanabe et al., "Preparation of dispersed platinum on conductive tin oxide and its catalytic activity for oxygen reduction," *J. Electrochem. Soc.*, 1998, 145, 3713 disclosed the preparation of anhydrous platinum tin oxide from an aqueous solution by spraying an aqueous solution of Sn onto a Pyrex surface held at 450° C. to make anhydrous SnO$_2$ thin films. The SnO$_2$ was then soaked in base and then treated with chloroplatinic acid. The materials were tested in half cells in alkaline solution for their ORR activity. Materials heated over 200° C. were most active, but the materials were not stable over long term use.

Another form of a Pt—SnO$_x$ catalyst was evaluated for its activity for methanol oxidation at a fuel cell anode (Katayama, "Electrooxidation of methanol on a platinum-tin oxide catalyst," *J. Phys. Chem.*, 1980, 84, 376-381). Pt on Sb-doped SnO$_x$ was prepared by spraying mixtures of tin, antimony, and platinum chlorides onto glass at 550-600° C. The catalysts were initially active, but were reduced over time in methanol, and lost their activity.

Pt—SnO$_x$ catalysts have also been developed for the oxidation of trace CO in CO$_2$ lasers (Gardner et al., *Proceedings of NASA Conferences on Long-Life CO$_2$ Laser Technology*, 1986, 1989, 1991, and 1992). The Pt—SnO$_x$ was typically dispersed on a silica support and heated. The catalysts heated at 150° C. had superior properties superior to those heated at 250° C. (Gardner et al., "Characterization study of silica-supported platinized tin oxide catalysts used for low-temperature CO oxidation: effect of pretreatment temperature," *J. Phys. Chem.*, 1991, 95, 835-838.). The active catalyst was attributed to sub oxides and tin metal.

SUMMARY OF THE INVENTION

The invention comprises a chemical composition comprising the formula:

$$M\text{—}SnO_x \cdot yH_2O.$$

M is a platinum group metal, and x and y are positive numbers.

The invention further comprises a device comprising: a cathode comprising the above chemical composition, an anode capable of catalytically oxidizing hydrogen, and an electrolyte in contact with both the cathode and the anode.

The invention further comprises a material comprising a conductive support and the above chemical composition.

The invention further comprises a method of electrochemical reduction comprising the steps of: providing a cathode comprising the above chemical composition, providing an anode, and contacting a substance to be reduced to the cathode.

BRIEF DESCRIPTION OF THE DRAWING

A more complete appreciation of the invention will be readily obtained by reference to the following Description of the Example Embodiments and the accompanying drawing.

DETAILED DESCRIPTION OF THE EXAMPLE EMBODIMENTS

Figure 1:
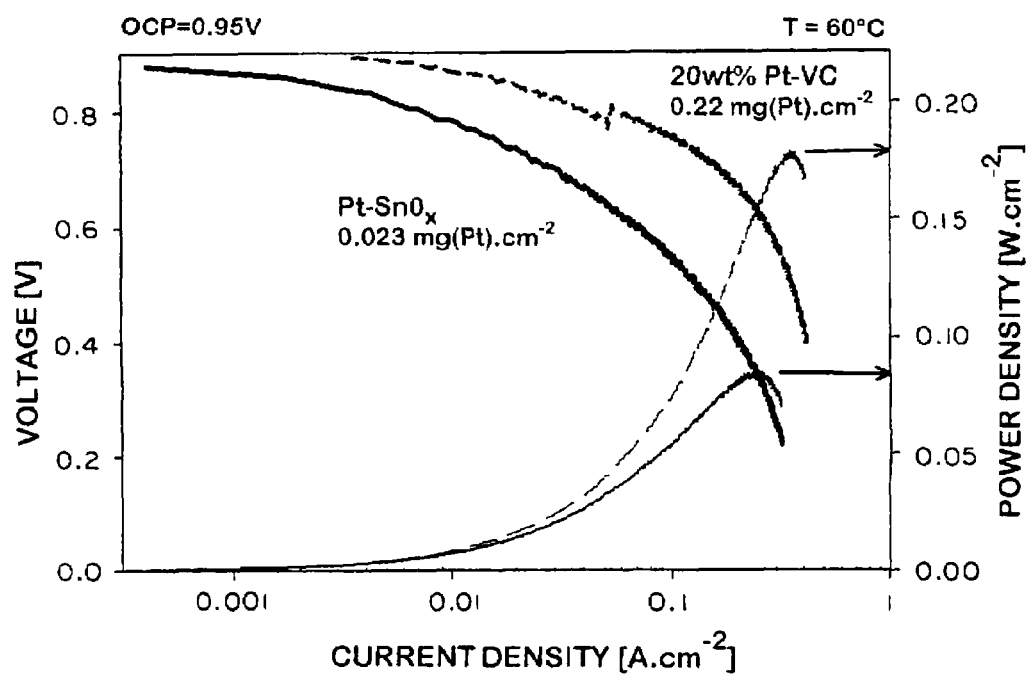
FIG. 1 shows the polarization curves for two H$_2$/O$_2$ PEMFCs at 60° C., 90% relative humidity and ambient pressure—one has a cathode with 0.02 mg Pt/cm$^2$ of Pt—SnO$_x$/VC and the other has a standard cathode with 0.2 mg Pt/cm$^2$ of 20% Pt/VC. Both have anodes with 0.2 mg Pt/cm$^2$ of 20% Pt/VC.

Catalysts based on hydrous tin oxides are ideal for fuel cells not only because of their stability, but because of their high protonic conduction. Other fuel cell research on Pt—SnO$_x$ materials focused on the use of anhydrous tin oxide, which has significantly lower protonic conductivity than the hydrous form (Dobrovolsky et al., "Low-temperature proton conductivity in hydrated and nonhydrated tin dioxide," *Solid State Ionics*, 1999, 119, 275-279). Hydrous tin oxides are also less prone to poisoning than metals, and some oxide catalysts are resistant to dissolution under the highly corrosive conditions at the PEMFC cathode. More importantly, the catalytic activity of platinum may be improved by using a tin oxide support, providing a means for lowering the Pt content of PEMFC cathodes.

A platinum group metal is used for M because of its catalytic properties in a PEMFC. The platinum group metal may be fully distributed throughout the material, as opposed to nanocrystallites or clusters, so that there are no metallic particles that increase in size over time. The platinum group metals include platinum, palladium, ruthenium, iridium, osmium, and rhenium. Suitable metals for M include, but are not limited to, platinum, palladium, iridium, and their alloys. The catalyst may comprise less than about 30% M by weight.

The numbers x and y are positive numbers. They do not have to be integers, as they represent average values. A suitable range for x includes, but is not limited to, about 1 to about 2. A suitable range for y includes, but is not limited to, greater than 0 up to about 2.

The chemical composition may be combined with a conductive support. The support can provide additional electron conduction and reduce the amount of catalyst needed per unit area. Suitable amounts of conductive support include, but are not limited to, up to 20% of the combined weight and up to 50% of the combined weight. Carbon black and Vulcan carbon are suitable conductive supports. The carbon can also be functionalized to increase the activity of the catalyst. The catalyst can be combined with the support by mechanical mixing or the tin oxide can be directly impregnated into carbon black by adding the carbon into the solution prior to the formation of the chemical composition. The composition may be substantially free of silica.

In one embodiment, the hydrous platinum tin oxide is doped to improve the electronic conductivity of the tin oxide phase. Potentially suitable dopants include, but are not limited to, In and Sb.

The hydrous platinum tin oxide may be useful as a catalyst for a fuel cell cathode. The design and construction of such fuel cells is well known in the art. The anode may comprise any hydrogen oxidizing catalyst as needed. Such catalysts are well known in the art of fuel cells. The electrolyte must be able to conduct protons from the anode to the cathode. Suitable electrolytes include, but are not limited to, Nafion and polybenzimidazole (PBI). Phosphoric acid may also be used in the case of phosphoric acid fuel cells.

The hydrous platinum tin oxides can be prepared by dissolving $SnSO_4$ in solution and precipitating the $SnO_x \cdot yH_2O$ via the addition of a base. Next, the $SnO_x \cdot yH_2O$ is impregnated with Pt from a solution of $H_2Pt(OH)_6$ in concentrated sulfuric acid and filtered. The resulting hydrous platinum tin oxide materials are air dried and heated from 150 to 200° C. in air. By heating below 200° C., the oxides retain >0.2 mole % water in their structure. The powdered materials can be mechanically mixed with 10 to 80 wt % Vulcan carbon to improve their electronic conductivity.

The hydrous platinum tin oxide catalysts may have comparable catalytic behavior as compared to pure Pt under conditions of a proton exchange membrane fuel cell. A fuel cell with low Pt loadings would make fuel cells much less costly and therefore more viable for commercialization.

Having described the invention, the following examples are given to illustrate specific applications of the invention. These specific examples are not intended to limit the scope of the invention described in this application.

Example 1

Preparation of Hydrous Platinum Tin Oxide

Hydrous tin oxide was prepared by dissolving 10 g $SnSO_4$ (Alfa) in 100 mL 18 MΩ·cm $H_2O$, stirring for 30 min, and then neutralizing the acidic solution with 1 M $NH_4OH$ (final pH=7.3). The resulting precipitate was vacuum filtered and air dried. The hydrous tin oxide powder was impregnated with Pt by stirring in a solution of 0.005 M $H_2Pt(OH)_6$ in 1 M $H_2SO_4$ with 70 mL of solution for every gram of $SnO_x$. The $SnO_x$ was stirred in the Pt solution overnight, and then filtered, and dried at 150° C. The material had 7.12 wt % Pt and 59.95 wt % Sn, according to ICP (Galbraith Lab, Knoxville Tenn.). The surface area and pore size distribution of the hydrous platinum tin oxide was determined via BET analysis under $N_2$ to 77K (Micromeretics ASAP 2010).

BET results on the hydrous platinum tin oxide showed a surface area of 36 $m^2/g$, an average pore size of 3.8 nm and a pore volume of 0.016 $cm^2/g$. The data indicates that there were predominantly micropores rather than mesopores in the catalyst. Microporous walls are excellent proton conductors (Colomban, Ed., *Proton Conductors: Solids, Membranes and Gels—Materials and Devices*, Cambridge University Press, Cambridge (1992)).

Example 2

Preparation of Membrane Electrode Assemblies

The Los Alamos National Laboratory protocol was used to make catalyst inks for evaluation in PEMFCs (adapted from Wilson et al., *Electrochim. Acta*, 1998, 40, 355). For the cathode ink, hydrous platinum tin oxide catalyst (0.012 g) was ground with 80 wt % VC (0.052 g) using a mortar and pestle. The powder is transferred to a glass vial and stirred with 0.5 g of 5% Nafion® ionomer solution and 0.25 glycerol and stirred for 1 hr. Next 26 µL of 1 M tetra-n-butylammonium hydroxide (TBAOH, 31% in methanol, Alfa) were added and the solution was stirred again for 1 hr. Another 0.25 g of glycerol was added before stirring the solution overnight. For the anode ink, the same procedures were used, except 0.065 g of 20% Pt/VC were used in place of the Pt—$SnO_x$/VC.

Teflon decals were used to make the membrane electrode assembly (MEA). Teflon squares (2.5×2.5 cm) were cleaned in water and isopropanol and dried at 10 min at 140° C. The inks were painted on the weighed Teflon square and dried in the oven at 150° C. for 30 min. Successive layers of catalyst and drying were carried out until the desired Pt loading was achieved (0.2 mg Pt/$cm^2$ for the anodes and standard cathode, and 0.02 mg Pt/$cm^2$ for the Pt/$SnO_x$ cathode).

The painted Teflon squares were sandwiched on their side of a sheet of Na-Nafion 112 with the catalyst touching the Nafion. The Nafion was preheated on a vacuum hot plate first. The ensemble was placed in a press with aluminum plates at 200° C., and pressed at 20 lbs/$cm^2$ of electrode. The temperature of the hot plate was increased to 210° C., and then the pressure was increased to 120 lbs/$cm^2$. The MEA was cooled down under the hot plates for 10 min under light pressure and then removed from the aluminum plates. The Teflon sheets were peeled off of the Nafion, and reweighed to determine the weight of any catalyst that may not have been transferred. The MEA was then boiled in 1 M $H_2SO_4$ and 18 MΩ·cm water for 1 hr each. The MEA was dried flat on a vacuum hot plate at 60° C.

The MEA was tested at 60° C. at ambient pressure in PEMFC hardware (Lynntech) with platinum-coated titanium plates having a serpentine flow pattern. $H_2$ and $O_2$ were humidified to 90% relative humidity by bubbling through heated water and then fed to the anode and cathode, respectively.

FIG. 1 compares the performance of the hydrous platinum tin oxide/VC and Pt/VC catalysts in $H_2/O_2$ PEMFCs. The Pt loadings of the hydrous platinum tin oxide/VC PEMFC were 0.02 mg Pt/cm² at the cathode and 0.2 mg Pt/cm² at the anode. The Pt/VC standard PEMFC has 0.2 mg Pt/cm² at both the cathode and anode. Note that the standard 20 wt % Pt/VC catalyst was at the anode in both of the PEMFCs. Under test conditions of $H_2/O_2$ at 60° C. and ambient pressure, the PEMFC with the hydrous platinum tin oxide/VC cathode had an open circuit potential (OCP) of 0.95 V The PEMFC with the Pt/SnO$_x$ cathode (0.02 mg Pt/cm²) reached a maximum power of 0.08 W/cm², while that with the 20% Pt/VC cathode (0.2 mg Pt/cm²) had a max power of 18 W/cm² When scaled to the amount of Pt in the electrodes, the Pt—SnO$_x$/VC catalyst had 350% higher performance per unit Pt than the standard 20% Pt/VC catalyst.

The hydrous platinum tin oxide/VC materials were stable to corrosion. Voltammetry inks were reused months after being prepared with no change to their ORR activity, and the hydrous platinum tin oxide/VC MEAs show no degradation of performance after removal from and then reassembly in a PEMFC. The PEMFC was operated for hours without any sign of degradation of the catalyst.

The addition of transition-metal dopants that improve the intrinsic electronic conductivity of the tin oxide (e.g., In, Sb) might improve the performance of the catalysts in fuel cells. Also, the preparation of Pt—SnO$_x$ nanoparticles dispersed on Vulcan carbon should show an increase in performance as the catalyst surface area and the electronic conductivity experienced by the nanoparticles will increase.

Obviously, many modifications and variations of the present invention are possible in light of the above teachings. It is therefore to be understood that the claimed invention may be practiced otherwise than as specifically described.

We claim:

1. A chemical composition comprising the formula:

M-SnO$_x$.yH$_2$O wherein M is a platinum group metal; and
wherein x and y are positive numbers.

2. The chemical composition of claim 1, wherein M is platinum.

3. The chemical composition of claim 2, wherein composition comprises platinum in an amount greater than 0 to about 30 percent by weight.

4. The chemical composition of claim 1,
wherein x is about 1 to about 2; and
wherein y is greater than 0 up to about 2.

5. The chemical composition of claim 1, wherein the composition is combined with a conductive support.

6. The chemical composition of claim 5, wherein the combination of the composition and the conductive support comprises at least 20% by weight of the conductive support.

7. The chemical composition of claim 5, wherein the combination of the composition and the conductive support comprises at least 50% by weight of the conductive support.

8. The chemical composition of claim 5, wherein the conductive support is carbon black.

9. The chemical composition of claim 1, wherein the composition is substantially free of silica.

10. An electrode comprising the chemical composition of claim 1.

11. A device comprising:
a cathode comprising a chemical composition comprising the formula:

M-SnO$_x$.yH$_2$O wherein M is a platinum group metal; and
wherein x and y are positive numbers;
an anode capable of catalytically oxidizing hydrogen; and
an electrolyte in contact with both the cathode and the anode.

12. The device of claim 11, wherein the device is a fuel cell.

13. The device of claim 11, wherein the cathode and the anode are on opposing surfaces of a proton-conducting membrane.

14. The device of claim 13, wherein the proton-conducting membrane comprises a perfluorosulfonic acid polymer.

15. A material comprising:
a conductive support; and
a chemical composition comprising the formula:

M-SnO$_x$.yH$_2$O wherein M is a platinum group metal; and
wherein x and y are positive numbers.

16. The material of claim 15, wherein the conductive support is conductive carbon.

17. A method of electrochemical reduction comprising the steps of:
providing an a cathode comprising a chemical composition comprising the formula:

M-SnO$_x$.yH$_2$O wherein M is a platinum group metal; and
wherein x and y are positive numbers;
providing an anode; and
contacting a substance to be reduced to the cathode.

18. The method of claim 17, wherein the substance to be reduced is oxygen.

* * * * *